(12) United States Patent
Okuyama

(10) Patent No.: US 11,787,044 B2
(45) Date of Patent: Oct. 17, 2023

(54) DISPLAY METHOD

(71) Applicant: Seiko Epson Corporation, Tokyo (JP)

(72) Inventor: Masayuki Okuyama, Suwa (JP)

(73) Assignee: SEIKO EPSON CORPORATION

( * ) Notice: Subject to any disclaimer, the term of this patent is extended or adjusted under 35 U.S.C. 154(b) by 234 days.

(21) Appl. No.: 16/856,115

(22) Filed: Apr. 23, 2020

(65) Prior Publication Data

US 2020/0338726 A1 Oct. 29, 2020

(30) Foreign Application Priority Data

Apr. 24, 2019 (JP) ................. 2019-082690

(51) Int. Cl.
*B25J 9/16* (2006.01)

(52) U.S. Cl.
CPC .................. *B25J 9/1605* (2013.01)

(58) Field of Classification Search
CPC ...... B25J 9/1605; B25J 9/1679; B25J 9/1697; B25J 9/1653; B25J 9/1638; B25J 9/1641; B25J 9/1671; G05B 2219/45096; G05B 19/4069; G05B 19/404; G05B 2219/39411; G05B 2219/40318; A61B 34/10
See application file for complete search history.

(56) References Cited

U.S. PATENT DOCUMENTS

| 2011/0093120 A1 | 4/2011 | Ando et al. | |
| 2013/0116828 A1* | 5/2013 | Krause | G05B 19/409 700/264 |
| 2019/0358824 A1* | 11/2019 | Takeuchi | B25J 9/161 |

FOREIGN PATENT DOCUMENTS

| CN | 107414834 A | 12/2017 |
| JP | H06-099376 A | 4/1994 |
| JP | 2009-042805 A | 2/2009 |
| JP | 2011-088225 A | 5/2011 |
| WO | 2017/018113 A1 | 2/2017 |

OTHER PUBLICATIONS

On_the_role_of_robot_configuration_in_Cartesian_stiffness_control. pdf (Arash Ajoudani, Nikos G. Tsagarakis, Antonio Bicchi, On the Role of Robot Configuration in Cartesian Stiffness Control, 2015, IEEE, pp. 1010-1016) (Year: 2015) (Year: 2015).*

(Continued)

*Primary Examiner* — Bao Long T Nguyen
(74) *Attorney, Agent, or Firm* — Harness, Dickey & Pierce, P.L.C.

(57) ABSTRACT

A display method according to an aspect of the present disclosure is a display method for displaying, on a display section, a simulation of a robot that executes work on an object with an end effector provided in an arm. The display method includes receiving information concerning a type of the robot, receiving information concerning the end effector, receiving information concerning a position or a posture of a control point for controlling arms, calculating rigidity at a working point of the end effector based on the received information concerning the type of the robot, the received information concerning the end effector, and the received information concerning the position or the posture of the control point, and displaying a result of the calculation of the rigidity on the display section as a figure.

2 Claims, 4 Drawing Sheets

(56) References Cited

OTHER PUBLICATIONS

On_the_role_of_robot_configuration_in_Cartesian_stiffness_control. pdf (Arash Ajoudani, Nikos G. Tsagarakis, Antonio Bicchi, On the Role of Robot Configuration in Cartesian Stiffness Control, 2015, IEEE, pp. 1010-1016) (Year: 2015).*

Master Dissertation of Zhejiang University, School of Mechanical Engineering, "Simulation and Experimental Study of Drag and Stiffness Visualization of 6R Manipulator", Applicant: Dang Yuanyuan; Supervisor: Lu Guodong Prof., Jan. 15, 2017, with English translation (89 Pages).

\* cited by examiner

DISPLAY METHOD

The present application is based on, and claims priority from JP Application Serial Number 2019-082690, filed Apr. 24, 2019, the disclosure of which is hereby incorporated by reference herein in its entirety.

BACKGROUND

1. Technical Field

The present disclosure relates to a display method.

2. Related Art

There has been a method of, in order to teach work desired to be executed by a robot to the robot, inputting position and posture information of the robot, simulating a track of a robot, as it is called, a track of a working point at an arm distal end portion of the robot, and displaying the track on a display section (see, JP A-6-99376 (Patent Literature 1)).

However, in the method described in Patent Literature 1, although the track of the working point at the arm distal end portion of the robot can be simulated, rigidity at the working point necessary for constructing a robot system cannot be simulated. Accordingly, in order to extract a condition having rigidity appropriate for work, a designer needs to repeatedly adjust the angle and the position of the working point and extract the condition. A lot of time is required for the construction of the robot system.

SUMMARY

A display method according to an aspect of the present disclosure is a display method for displaying, on a display section, a simulation of a robot that executes work on an object with an end effector provided in an arm, the display method including: receiving information concerning a type of the robot; receiving information concerning the end effector; receiving information concerning a position or a posture of a control point for controlling the arm; calculating rigidity at a working point of the end effector based on the received information concerning the type of the robot, the received information concerning the end effector, and the received information concerning the position or the posture of the control point; and displaying a result of the calculation of the rigidity on the display section as a figure.

In the display method, the information concerning the type of the robot may include length of the arm and a number of joints of the robot.

In the display method, the information concerning the end effector may include length of the end effector, an angle of the end effector, and a position of the working point.

In the display method, the figure may be an arrow.

DESCRIPTION OF EXEMPLARY EMBODIMENTS

Figure 1:
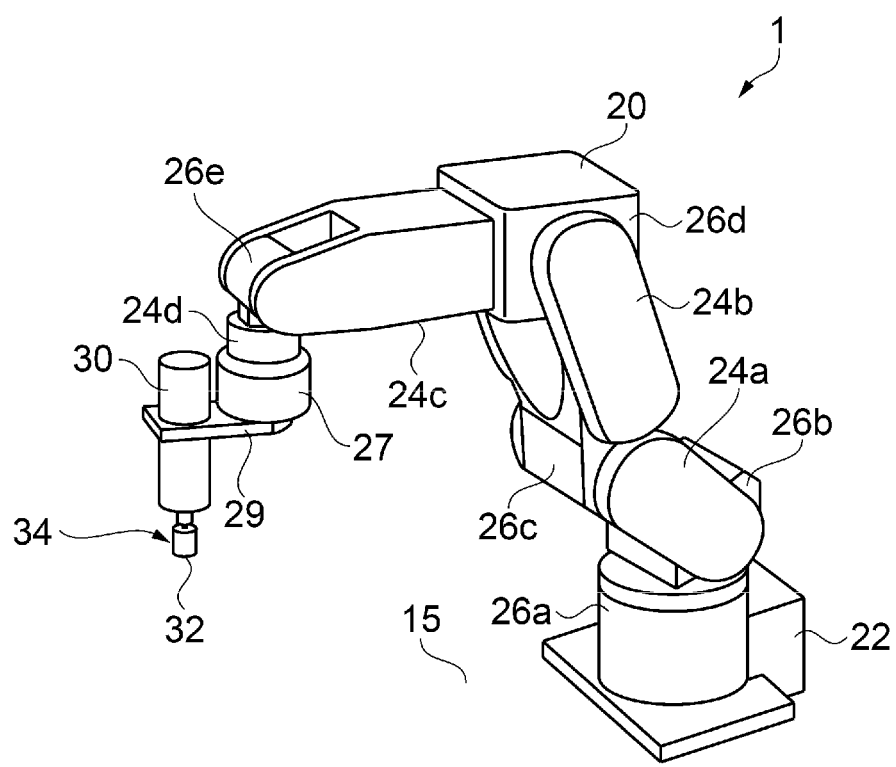
FIG. 1 is a perspective view showing the configuration of a robot system.

Display methods according to embodiments of the present disclosure are explained below with reference to the accompanying drawings. Components corresponding to one another in the figures are denoted by the same reference numerals and signs and redundant explanation of the components is omitted.

First Embodiment

As an example of a display method according to a first embodiment, a method of displaying the rigidity at a working point in a robot system is explained with reference to FIGS. 1 to 3.

FIG. 1 is a perspective view showing the configuration of the robot system. FIG. 2 is a flowchart for explaining the display method according to the first embodiment. FIG. 3 is a diagram showing a display image displayed by the display method according to the first embodiment.

Overall Configuration of the Robot System

A robot system 1 includes, as shown in FIG. 1, a robot 20, a control device 22, and an end effector 30. The control device 22 is communicably coupled to the robot 20. This coupling conforms to a wired communication standard such as Ethernet (registered trademark) or USB (Universal Serial Bus) or a wireless communication standard such as Wi-Fi (registered trademark).

The robot 20 acquires a control signal from the control device 22 and performs predetermined work on an object based on the acquired control signal. The predetermined work is, for example, polishing or machining of the object by the end effector 30 or work for gripping the object and moving the gipped object from a position where the object is currently set to another position and assembling the object to another apparatus after moving the object.

The robot 20 is a vertical articulated type called six-axis and is fixed to a setting surface 15 such as a floor. The robot 20 is configured by coupling a plurality of joint sections 26a, 26b, 26c, 26d, and 26e and a plurality of arms 24a, 24b, 24c, and 24d. A force sensor 27 is attached to the distal end of the arm 24d. The end effector 30 is attached to the surface on the opposite side of the arm 24d side of the force sensor 27 via a holding jig 29.

The force sensor 27 can detect slight force and moment in six axial directions at the distal end of the arm 24d of the robot 20. Consequently, it is possible to realize automation of high precision work, which has been difficult in a manufacturing site, and achieve improvement of productivity.

The end effector 30 is a polishing device for polishing the surface and the side surface of an object. A polishing section 32 that rotates around the axis in the major axis direction of the end effector 30 is provided in the end effector 30. Accordingly, a working point 34 of the end effector 30 is the center axis of the polishing section 32 or a side surface of the polishing section 32 that is in contact with the object.

The rigidity at the working point 34 of the end effector 30 attached to the robot 20 greatly changes according to the posture of the robot 20. Accordingly, in the case of polishing work, the rigidity at the working point 34 is extremely important in constructing the robot system 1 because an optimum posture of the robot 20 changes according whether the object is desired to be polished soft or polished hard.

Therefore, it is extremely effective in greatly reducing a time required for the construction of the robot system 1 to simulate the rigidity at the working point 34 of the robot system 1 and understanding the posture of the robot 20 and the direction of the working point 34 for obtaining rigidity appropriate for work.

Display Method

A method of calculating the rigidity at the working point 34 of the end effector 30 of the robot 20 that executes work on an object with the end effector 30 provided in the arm 24d and a display method for displaying a result of the calculation on a display section 10 are explained.

Figure 2:
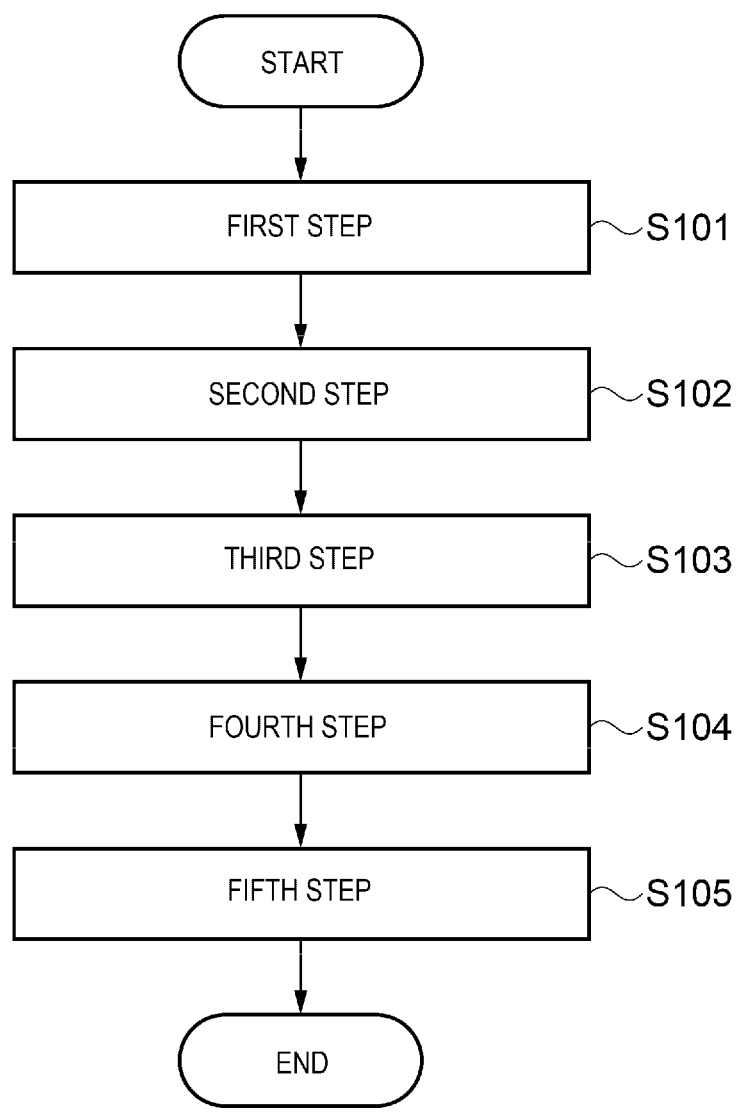
FIG. 2 is a flowchart for explaining a display method according to a first embodiment.

In the method of calculating the rigidity at the working point 34 of the end effector 30 in this embodiment, as shown in FIG. 2, first, in step S101, as a first step, information concerning the type of the robot 20 is received. The information concerning the type of the robot 20 is a type of the robot 20 such as a horizontal articulated type called SCARA or a vertical articulated type called six-axis, the lengths of the arms 24a to 24d of the robot 20, the number of joints, which is the number of the joint sections 26a to 26e, the rigidity of reduction gears of the joint sections 26a to 26e, and the like.

Subsequently, in step S102, as a second step, information concerning the end effector 30 is received. The information concerning the end effector 30 is the length of the end effector 30, an angle with respect to the setting surface 15, which is an attachment angle of the end effector 30, the distance between the holding jig 29, which holds the end effector 30, and the working point 34, the position of the working point 34, and the like.

Subsequently, in step S103, as a third step, information concerning the position or the posture of a control point for controlling the arm 24d is received. The information concerning the position or the posture of the control point is the position of the control point, the posture of the arms 24a to 24d, which is the posture of the robot 20, and the like.

Subsequently, in step S104, as a fourth step, the rigidity at the working point 34 of the end effector 30 is calculated based the received information concerning the type of the robot 20, the received information concerning the end effector 30, and the received information concerning the position or the posture of the control point.

When force is applied to the working point 34 while changing the direction of the force, the rigidity at the working point 34 is calculated as a displacement direction of the working point 34 and is represented as an ellipsoid called "compliance ellipse". The major axis direction of the ellipse indicates a direction in which the working point 34 is soft. Displacement is large in the major axis direction of the ellipse. The minor axis direction of the ellipse indicates a direction in which the working point 34 is hard. Displacement is small in the minor axis direction of the ellipse.

The ellipse representing the rigidity at the working point 34 can be calculated by the following method. In the following explanation, the six-axis robot 20 shown in FIG. 1 is explained as an example. The working point 34 is referred to as "finger".

First, robot joint angle displacement $\Delta\theta = (\Delta\theta_1, \Delta\theta_2, \Delta\theta_3, \Delta\theta_4, \Delta\theta_5, \Delta\theta_6)$ and finger position displacement $\Delta X = (\Delta x_1, \Delta x_2, \Delta x_3, \Delta x_4, \Delta x_5, \Delta x_6)$ are associated by a 6×6 Jacobian matrix J as indicated by the following Expression (1).

$$\Delta X = J \Delta \theta \quad (1)$$

The Jacobian matrix J is calculated by partially differentiating an expression for calculating a finger position from a joint angle, $X = f(\theta)$. An approximation formula of this matrix is calculated using a standard function of the robot 20.

A joint angle $\theta 0 = (\theta 01, \theta 02, \theta 03, \theta 04, \theta 05, \theta 06)$ is calculated for a position $X0 = (x01, x02, x03, x04, x05, x06)$ where rigidity is desired to be calculated. Subsequently, only a first joint is moved by a very small angle $\Delta\theta$ to calculate a finger position $X = (x1, x2, x3, x4, x5, x6)$ at the time of $\theta = (\theta 01 + \Delta\theta, \theta 02, \theta 03, \theta 04, \theta 05, \theta 06)$.

From Expression (1), the relation of $(X1-X01, X2-X02, X3-X03, X4-X04, X5-X05, X6-X06) = J(\Delta\theta, 0, 0, 0, 0, 0)$ holds. Therefore, first column components of the Jacobian matrix can be calculated.

The first column components are respectively $J11 = x1-x01$, $J21 = x2-x02$, $J31 = x3-x03$, $J41 = x4-x04$, $J51 = x5-x05$, and $J61 = x6-x06$.

Similarly, second to sixth column components of the Jacobian matrix can be calculated by moving only second to sixth joints by the very small angle $\Delta\theta$ and calculating the finger position.

Subsequently, when the Jacobian matrix approximation formula is used, joint torque $\tau = (\tau 1, \tau 2, \tau 3, \tau 4, \tau 5, \tau 6)$ at the time when force $F = (f1, f2, f3, f4, f5, f6)$ is applied to the finger can be calculated by Expression (2).

$$\tau = JTF \quad (2)$$

where, JT represents a transposed matrix of J.

When the torque $\tau$ is applied to a joint, displacement $\Delta\theta = (\Delta\theta 1, \Delta\theta 2, \Delta\theta 3, \Delta\theta 4, \Delta\theta 5, \Delta\theta 6)$ occurs in a joint angle because of torsional rigidity of a robot joint. A factor of the joint angle displacement $\Delta\theta$ is dominated by rigidity $k = (k1, k2, k3, k4, k5, k6)$ of a reduction gear. Therefore, the factor can be calculated by Expression (3).

$$\Delta\theta = \tau k \quad (3)$$

Further, finger displacement $\Delta X$ at the time when the force F is applied to the finger in this way can be calculated from Expression (1).

Therefore, the "compliance ellipse", which is the ellipsoid centering on the working point 34, which is the finger, can be calculated by applying the force F to the finger from various directions and calculating displacement destinations of the finger.

Figure 3:
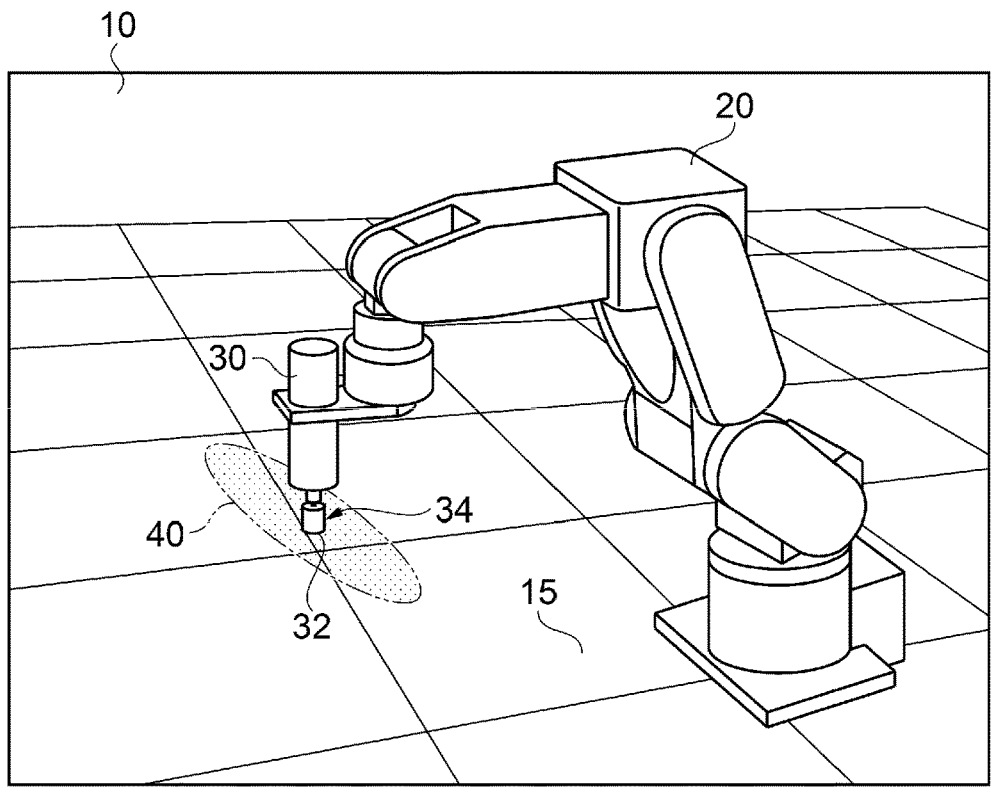
FIG. 3 is a diagram showing a display image displayed by the display method according to the first embodiment.

Subsequently, in step S105, as a fifth step, as shown in FIG. 3, the "compliance ellipse", which is a calculation result of the rigidity at the working point 34, is displayed on the display section 10 as a figure 40.

In the "compliance ellipse" of the figure 40, the major axis direction of the ellipse indicates a direction in which displacement is large and the rigidity at the working point 34 is small, as it is called, a soft direction, and the minor axis direction of the ellipse indicates a direction in which displacement is small and the rigidity at the working point 34 is large, as it is called, a hard direction.

The display section 10 is a display or the like of a personal computer or a work station that calculates rigidity. The figure 40 is displayed as a collection of dots. However, the figure 40 may be displayed as a 3D ellipsoid object.

With the display method explained above, the rigidity at the working point 34 of the end effector 30 is calculated based on the information concerning the type of the robot 20, the information concerning the end effector 30, and the information concerning the position or the posture of the control point and a calculation result of the rigidity is displayed as the figure 40. Consequently, it is possible to easily extract a condition having rigidity appropriate for work. It is possible to greatly reduce a time required for construction of the robot system 1.

The lengths of the arms 24a to 24d of the robot 20 and the number of joints of the robot 20 are included in the information concerning the type of the robot 20. Therefore, it is possible to more accurately calculate the rigidity at the working point 34 of the end effector 30.

The length of the end effector 30, the angle of the end effector 30, and the position of the working point 34 are included in the information concerning the end effector 30. Therefore, it is possible to more accurately calculate the rigidity at the working point 34 of the end effector 30.

In this embodiment, the rigidity in the polishing work is explained. However, in inserting work as well, it is important to calculate rigidity involved in the posture of the robot 20. In other words, in the case of peg inserting work having fitting dimension tolerance, it is desirable to control force in an inserting direction, as it is called, the up-down direction of the robot 20 in FIG. 3, reduce rigidity in a plane direction orthogonal to the inserting direction, as it is called, the horizontal direction of the robot 20 in FIG. 3, and insert a peg following a hole. Accordingly, it is made clear by calculating the rigidity that, in work in a place close to the robot 20, a characteristic of following the hole is different because the rigidity is greatly different depending on the horizontal direction and, in work in a place far from the robot 20, the rigidity is substantially the same in the horizontal direction and there is no difference in the following characteristic due to a direction. In such work, it can be determined that it is better to work in the place far from the robot 20.

Second Embodiment

A display method according to a second embodiment is explained with reference to FIG. 4.

Figure 4:
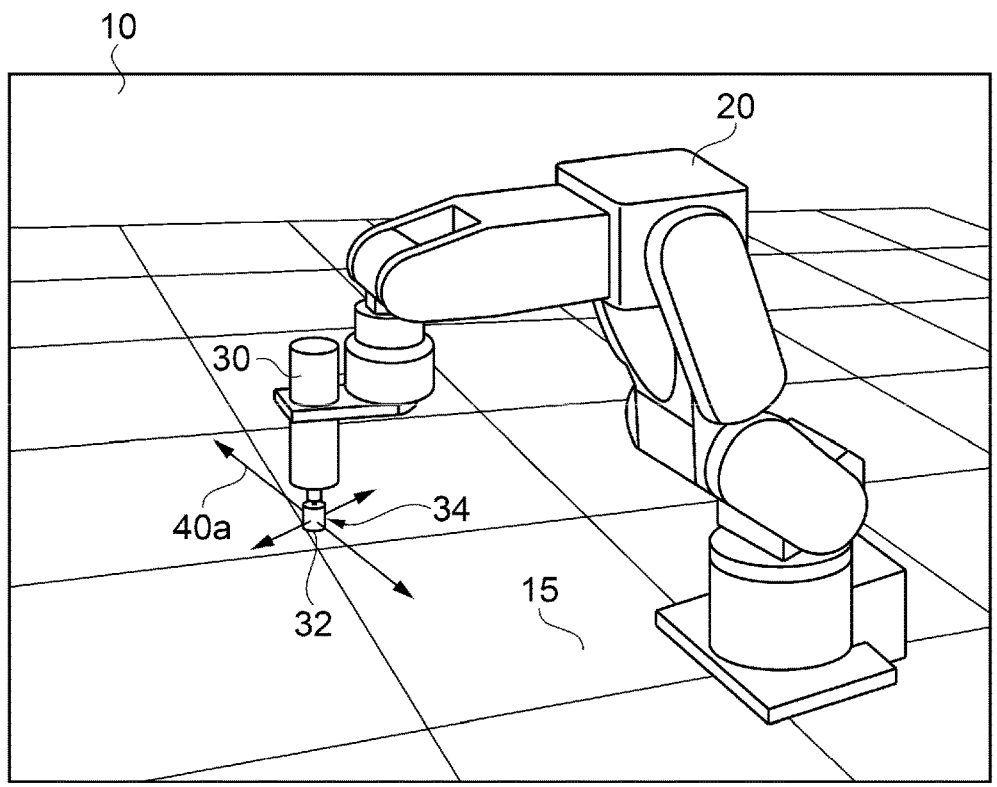
FIG. 4 is a diagram showing a display image displayed by a display method according to a second embodiment.

FIG. 4 is a diagram for explaining a display image displayed by the display method according to the second embodiment.

Differences from the first embodiment explained above are mainly explained. Explanation of similarities to the first embodiment is omitted. This embodiment is the same as the first embodiment except that a method of displaying a figure 40a indicating a calculation result of rigidity is different.

In the display method according to this embodiment, as shown in FIG. 4, a calculation result of the rigidity at the working point 34 of the end effector 30 is displayed as the figure 40a using arrows indicating vectors only in inertial axis directions.

The lengths of the arrows indicate magnitudes of displacements. The displacements are large in directions in which the arrows are long. The displacements are small in directions in which the arrows are short.

It is possible to make it easier to understand the directions and the magnitudes of the rigidities by indicating the calculation results of the rigidities as the arrows in this way.

Third Embodiment

A display method according to a third embodiment is explained with reference to FIG. 5.

Figure 5:
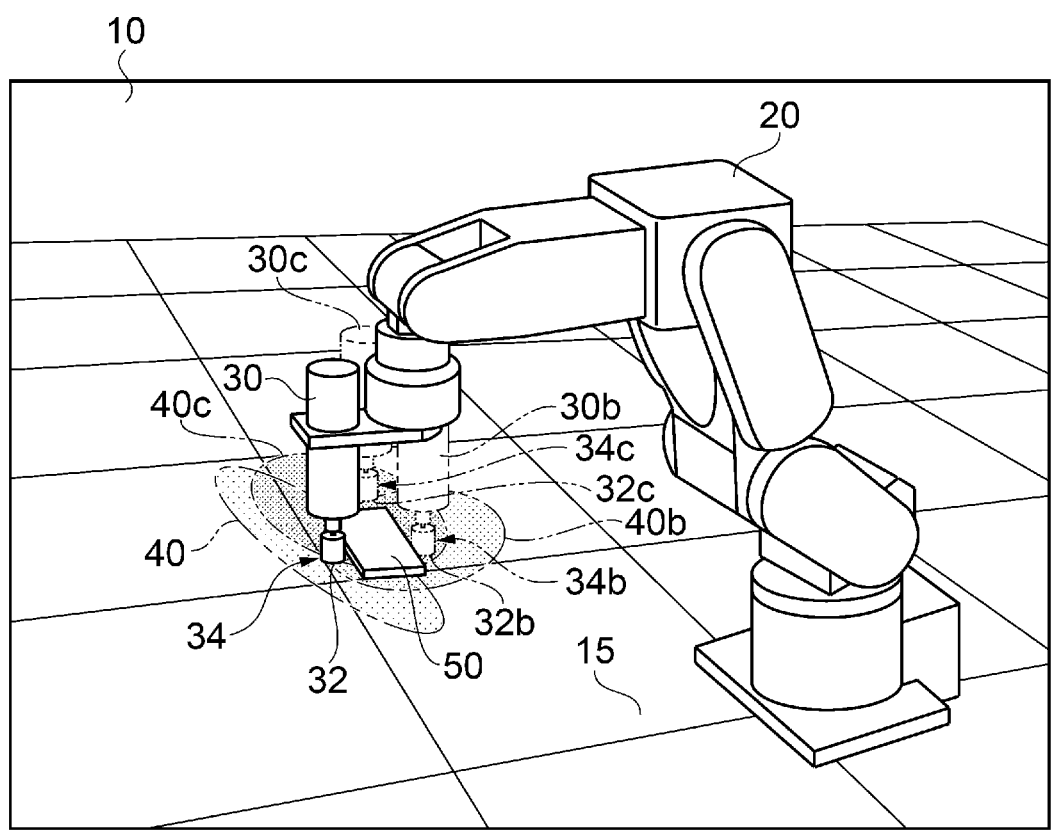
FIG. 5 is a diagram showing a display image displayed by a display method according to a third embodiment.

FIG. 5 is a diagram for explaining a display image displayed by the display method according to the third embodiment.

Differences from the first embodiment explained above are mainly explained. Explanation of similarities to the first embodiment is omitted. This embodiment is the same as the first embodiment except that a plurality of figures 40 40b, and 40c indicating calculation results of rigidities are simultaneously displayed.

In the display method according to this embodiment, as shown in FIG. 5, the plurality of figures 40, 40b, and 40c indicating the rigidities at working points 34, 34b, and 34c calculated in different positions are simultaneously displayed on the display section 10. The posture of the robot 20 with respect to work 50, which is an object, is changed and the positions of the working points 34, 34b, and 34c are differentiated to calculate the rigidities in the positions. Results of the calculation are disposed in the positions of the working points 34, 34b, and 34c and simultaneously displayed as the figures 40, 40b, and 40c together with end effectors 30, 30b, and 30c and polishing sections 32, 32b, and 32c.

In this way, the plurality of figures 40, 40b, and 40c indicating the rigidities at the working points 34, 34b, and 34c calculated in the different positions are simultaneously displayed. Consequently, it is possible to more clearly confirm differences among the rigidities due to differences among the positions of the working points 34, 34b, and 34c.

Contents deriving from the embodiments explained above are described below.

A display method is a display method for displaying, on a display section, a simulation of a robot that executes work on an object with an end effector provided in an arm, the display method including: receiving information concerning a type of the robot; receiving information concerning the end effector; receiving information concerning a position or a posture of a control point for controlling the arm; calculating rigidity at a working point of the end effector based on the received information concerning the type of the robot, the received information concerning the end effector, and the received information concerning the position or the posture of the control point; and displaying a result of the calculation of the rigidity on the display section as a figure.

With the display method, the rigidity at the working point of the end effector is calculated based on the information concerning the type of the robot, the information concerning the end effector, and the information concerning the position or the posture of the control point and the calculation result of the rigidity is displayed as the figure. Therefore, it is possible to easily extract a condition having rigidity appropriate for work. It is possible to greatly reduce a time required for construction of a robot system.

In the display method, the information concerning the type of the robot may include length of the arm and a number of joints of the robot.

With the display method, since the length of the arm and the number of joints of the robot are included in the information concerning the type of the robot, it is possible to more accurately calculate the rigidity at the working point of the end effector.

In the display method, the information concerning the end effector may include length of the end effector, an angle of the end effector, and a position of the working point.

With the display method, since the length of the end effector, the angle of the end effector, and the position of the working point are included in the information concerning the end effector, it is possible to more accurately calculate the rigidity at the working point of the end effector.

In the display method, the figure may be an arrow.

With the display method, by displaying the calculation result of the rigidity as the arrow, it is possible to make it easier to understand the direction and the magnitude of the rigidity.

What is claimed is:

1. A display method for displaying, on a display section, a simulation of a robot that executes work on an object with an end effector provided in an arm via a holding jig, the display method comprising:

receiving first information indicating a type of the robot, wherein the first information indicates at least lengths of arms of the robot, a number of joints of the robot, and rigidity of reduction gears of the joints;

receiving second information indicating characteristics of the end effector, wherein the second information indicates at least a length of the end effector, an attachment angle of the end effector with respect to a setting surface on which the robot is placed, a position of a working point of a working tool attached to the end effector, and a distance between the working point and the holding jig;

receiving third information indicating a position or a posture of a control point for controlling the arm;

calculating rigidity at the working point of the working tool based on the first information, the second information, and the third information, wherein calculating the rigidity includes applying a force to the working point from a plurality of directions and calculating respective displacements of the working point caused by applying the force from the plurality of directions; and displaying a result of the calculation of the rigidity on the display section as a figure that indicates the respective displacements, wherein displaying the result includes displaying the robot on the setting surface and displaying the figure over the working point of the displayed robot and the displayed setting surface, and wherein the figure indicates both direction and magnitude of the displacements caused by applying the force, wherein the working point of the working tool is a center axis of the working tool or a side surface of the working tool that is in contact with the object.

2. The display method according to claim 1, wherein the figure is an arrow.